(12) United States Patent
Kwon et al.

(10) Patent No.: US 11,279,292 B2
(45) Date of Patent: Mar. 22, 2022

(54) VEHICLE TRAY

(71) Applicant: NIFCO KOREA INC., Asan-si (KR)

(72) Inventors: Hyuk Du Kwon, Asan-si (KR); Seong Kwon No, Asan-si (KR)

(73) Assignee: NIFCO KOREA Inc., Asan (KR)

( * ) Notice: Subject to any disclaimer, the term of this patent is extended or adjusted under 35 U.S.C. 154(b) by 0 days.

(21) Appl. No.: 16/315,225

(22) PCT Filed: Jul. 6, 2017

(86) PCT No.: PCT/KR2017/007244
§ 371 (c)(1),
(2) Date: Jan. 4, 2019

(87) PCT Pub. No.: WO2018/009004
PCT Pub. Date: Jan. 11, 2018

(65) Prior Publication Data
US 2021/0146845 A1 May 20, 2021

(30) Foreign Application Priority Data
Jul. 6, 2016 (KR) .................. 20-2016-0003917

(51) Int. Cl.
*B60R 7/04* (2006.01)
*B60R 11/00* (2006.01)
(52) U.S. Cl.
CPC ............ *B60R 7/04* (2013.01); *B60R 11/00* (2013.01); *B60R 2011/0084* (2013.01)
(58) Field of Classification Search
CPC ... B60R 7/04; B60R 11/00; B60R 2011/0084; B60R 2011/0075; B60R 2011/0005
(Continued)

(56) References Cited

U.S. PATENT DOCUMENTS

| 6,585,465 B1* | 7/2003 | Hammond | ............ B60P 7/0815 |
| | | | 410/104 |
| 2015/0151661 A1* | 6/2015 | Morel | ........................ B60R 7/04 |
| | | | 296/37.1 |
| 2018/0029536 A1* | 2/2018 | Murray | .................... B60R 7/04 |

FOREIGN PATENT DOCUMENTS

| JP | 2009-006737 A | 1/2009 |
| KR | 10-1999-0035680 A | 5/1999 |

(Continued)

*Primary Examiner* — Nathan J Newhouse
*Assistant Examiner* — Lester L Vanterpool
(74) *Attorney, Agent, or Firm* — Porter, Wright, Morris & Arthur, LLP

(57) ABSTRACT

The present invention relates to a vehicle tray and, more specifically, the objective of the present invention is to prevent a cover slidably provided inside a tray body from moving by vibration generated when a vehicle travels and, simultaneously, to prevent, in advance, the generation of friction noise when protrusions come into contact with guide rails provided in the tray body even when the cover is operated. The present invention comprises: a tray body (100) having an accommodation part (110) of which the upper side is open; the guide rails (300) fixedly provided, respectively, at both the left and right sides of the accommodation part (110); and a cover (200) having the guide protrusions (210), which are formed to respectively protrude from both the left and right sides thereof and slide while being guided along the guide rails (300). In order to achieve the present invention, protrusion parts (211) having mounting grooves (211*a*) protrude from the front and rear end portions of the guide protrusion (210) of the cover (200), and a silicone ring (400) having elastic force itself and having an outer surface coming into contact with the inner wall surface of the guide rail (300) is provided at the protrusion part (211) in a state in which the inner surface thereof is mounted in the mounting groove (211*a*).

2 Claims, 8 Drawing Sheets

(58) Field of Classification Search
USPC .......................................................... 224/555
See application file for complete search history.

(56) References Cited

FOREIGN PATENT DOCUMENTS

| KR | 10-2005-0096660 A | 10/2005 |
| KR | 10-2006-0016350 A | 2/2006 |
| KR | 10-2006-0033526 A | 4/2006 |

\* cited by examiner

VEHICLE TRAY

BACKGROUND OF THE INVENTION

Technical Field

The present invention relates to a vehicle tray and, more specifically, to a vehicle tray for preventing a cover slidably provided inside a tray body from moving by the vibration generated during the traveling of a vehicle as well as forestalling the generation of frictional sound when protrusions come into contact with the guide rails provided in the tray body even when the cover is operated.

Background Art

In general, in most cases, a vehicle tray is configured to have a housing for storing articles and a cover for opening and closing the opening of the housing, wherein the cover is rotatably installed in the housing.

FIG. 1 shows three examples of the prior art vehicle trays, in particular, those provided on the inner projection portion of a door.

FIG. 1(a) shows a perspective view of the vehicle tray disclosed in Japanese Utility Model Publication No. 62-33335, in which the vehicle tray includes an accommodation part 51 having an approximately "L"-shaped section, which is open at a top portion formed at the top surface corner of an armrest part 50, and a cover 52 having an approximately inversed "L"-shaped section corresponding to the accommodation part 51.

The cover 52 is assembled to the lower edge portion of the indoor side of the accommodation part 51 so as to be rotatable through a pivot 53, wherein when a container K or the like is put in or taken out of the accommodation part 51, the cover 52 is switched between a closing position and an opening position with respect to the pivot 53 such that the cover 52 covers the accommodation part 51 at the closing position and opens the accommodation part 51 into a use state at the opening position by rotating to the indoor side.

In addition, the vehicle trays shown in FIG. 1(b) and FIG. 1(c) are common in that accommodation parts 54 and 57 are formed in concave shapes at the top surface portions of arm rest parts 50 such that a container K or the like is inserted into the concave portions from above the accommodation parts 54 and 57.

Referring to FIG. 1(b), a cover 55 is rotatably assembled to the edge portion of the upper opening of the accommodation part 54 through a pivot 56, wherein the cover 55 is switched, with respect to the pivot 56, between a closing position where the upper opening of the accommodation part 54 is closed and an opening position where the cover 55 is rotated to the outside.

Referring to FIG. 1(c), a cover 58 is rotatably assembled to the edge portion of the upper opening of the accommodation part 54 through a pivot 59 and an elastically supporting spring 60, wherein the cover 58 is switched from a closing position where the cover 58 covers the upper opening of the accommodation part 57 to an opening position by rotating inwards with respect to the pivot 59 against the spring force of the elastically supporting spring 60.

Meanwhile, the accommodation parts 51, 54, 57 can be used as storage parts for articles other than containers.

Such the conventional vehicle trays are simple and compact in terms of keeping the container K or putting articles in or taking them out.

Compared to the structure shown in FIG. 1(a), the structures shown in FIGS. 1(b) and (c) are excellent in that the covers 55 and 58 do not protrude indoors and the structure of 1(c) is excellent in that the cover 58 in the opening position does not stand in the way like the cover 55 of FIG. 1(b) when an article or the container K is taken out.

However, the prior art vehicle trays have disadvantages that the accommodation parts must have a certain depth in order to secure the article storage, container retention or the like such that as the depth of the accommodation parts increases, for example, the accessibility of an article becomes worse or the opening and closing operations of the cover deteriorates.

In addition, the prior art vehicle trays have further disadvantages that in the case where the installation positions of the accommodation parts 51, 54 and 57 are provided on the standing wall 61a of the inner projection portion 61 of the door as schematically shown in FIG. 1(c), an article or the container K may come into contact with the standing wall 61a and become dirty when the article or container K is inserted into or withdrawn from the accommodation part 57, or the accommodation parts 51, 54 and 57 protrude much indoors and thus are likely to deteriorate safety or appearance.

Therefore, in order to solve the above problems, the opening and closing of the cover have been carried out conventionally by installing guide rails on both the left and right sides of the tray body having the accommodation part that is open at the top portion and providing guide protrusions to be inserted into the guide rails on both the left and right sides of the cover such that the guide protrusions formed on both the left and right sides of the cover are moved while being inserted into the guide rails provided on the tray body.

However, these conventional vehicle trays still have problems that the rattling occurs in the cover due to the vibration generated during the traveling of the vehicle, since when the guide protrusions formed on both the left and right sides of the cover are inserted into the guide rails installed on both the left and right sides of the opening portion of the tray body, the insertion must be carried out while securing operation gaps so that the guide protrusions are guided along the guide rails and thus the opening or closing is carried out. Of course, in the case where the operation gaps between the guide protrusions and the guide rails are reduced and the guide protrusions are inserted into the guide rails, there is a problem that the operating force becomes large during the opening and closing of the cover, resulting in malfunction.

DETAILED DESCRIPTION OF THE INVENTION

Technical Problem

Accordingly, the present invention has been made in an effort to solve the above-mentioned problems and disadvantages occurring in the prior arts and has an objective to provide a vehicle tray for preventing the generation of frictional sound by preventing the guide protrusions, which are formed on both the left and right sides of the cover, from coming into direct contact with the guide rails, which are provided on both the left and right sides of the tray body, even when the guide protrusions are slidably inserted into the guide rails as well as preventing the cover having the guide protrusions from moving in the vertical and horizontal directions due to the vibration generated during the traveling of the vehicle.

The present invention has another objective to provide a vehicle tray with improved the emotional quality by lowering the operating force required to open and close the cover.

Technical Solution

In order to achieve the objectives of the present invention as described above, there is provided a tray vehicle similar to the prior art, in which the tray vehicle comprises: a tray body 100 having an accommodation part 110 of which the upper side is open; guide rails 300 fixedly provided at both the left and right sides of the accommodation part 110 respectively; and a cover 200 having guide protrusions 210, which are formed to protrude from both the left and right sides thereof respectively and slidingly move while being guided along the guide rails 300.

However, the tray vehicle according to the present invention is characterized in that protrusion parts 211 having mounting grooves 211a protrude from the front and rear end portions of the guide protrusions 210 of the cover 200, and a silicone ring 400 having elastic force itself is provided on the protrusion part 211, wherein the outer surface of the silicon ring 400 comes into contact with the inner wall surface of the guide rail 300 while the inner surface of the silicon ring 400 is mounted on the mounting groove 211a.

Meanwhile, the silicone ring 400 includes a first body 410, which is formed in an O-ring shape such that the outer surface of the first body 410 comes into contact with the upper and lower surfaces of the inner wall surface of the guide rail 300, and a second body 420, which is formed in a hemispherical shape such that the outer surface of the second body 420 comes into contact with the vertical surface of the inner wall surface of the guide rail 300.

Advantageous Effects

According to the vehicle tray of present invention, the guide protrusion is inserted into the guide rail in a state, in which each silicon ring, which is in contact with the upper surface, the lower surface, and the inner wall surface of the guide rail, is coupled to the protrusion parts formed at the front and rear ends of the guide protrusion, such that the guide protrusions, which are formed on both the left and right sides of the cover, are prevented from coming into direct contact with the guide rails, resulting in the prevention of the frictional sound, even when the guide protrusions are slidably inserted into the guide rails, as well as the cover having the guide protrusions is prevented from moving in the vertical and horizontal directions due to the vibration generated during the traveling of the vehicle, resulting in the prevention of noise such as the frictional sound.

Meanwhile, according to the vehicle tray of the present invention, the cover can be easily opened and closed even in the case where the guide protrusions formed on both the left and right sides of the cover are inserted into the guide rails in such a way that the guide protrusions do not move.

BRIEF EXPLANATION OF REFERENCE SYMBOLS

Figure 1:
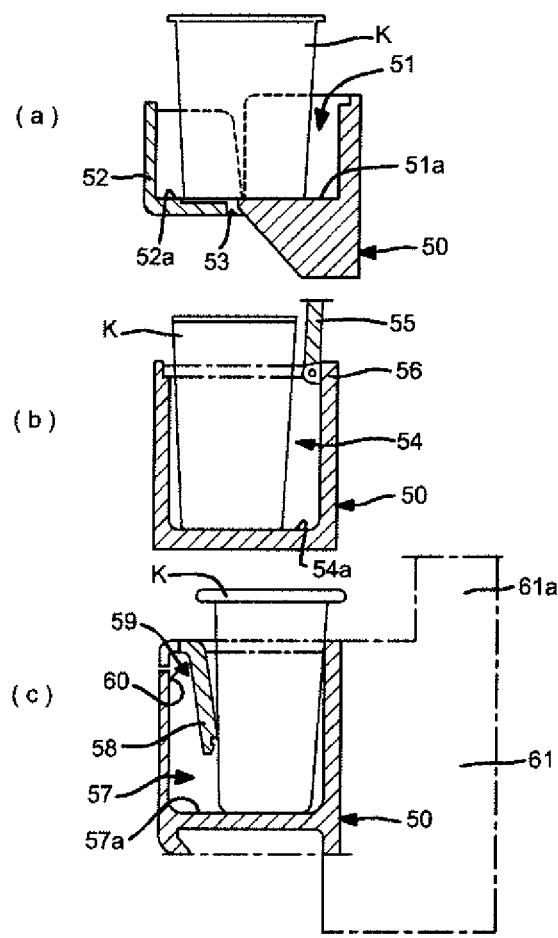
FIG. 1 *a* is a sectional view showing an embodiment of a conventional vehicle tray, FIG. 1 *b* is a sectional view showing another embodiment of a conventional vehicle tray, and FIG. 1 *c* is a sectional view showing still another embodiment of a conventional vehicle tray.

100: tray body
110: accommodation part
200: cover
210: guide protrusions
211: protrusion parts
211a: mounting grooves
300: guide rails
400: silicone ring
410: first body

BEST MODE FOR CARRYING OUT THE INVENTION

Hereinafter, the present invention will be described in detail in terms of configuration with reference to the accompanying drawings.

Figure 2:
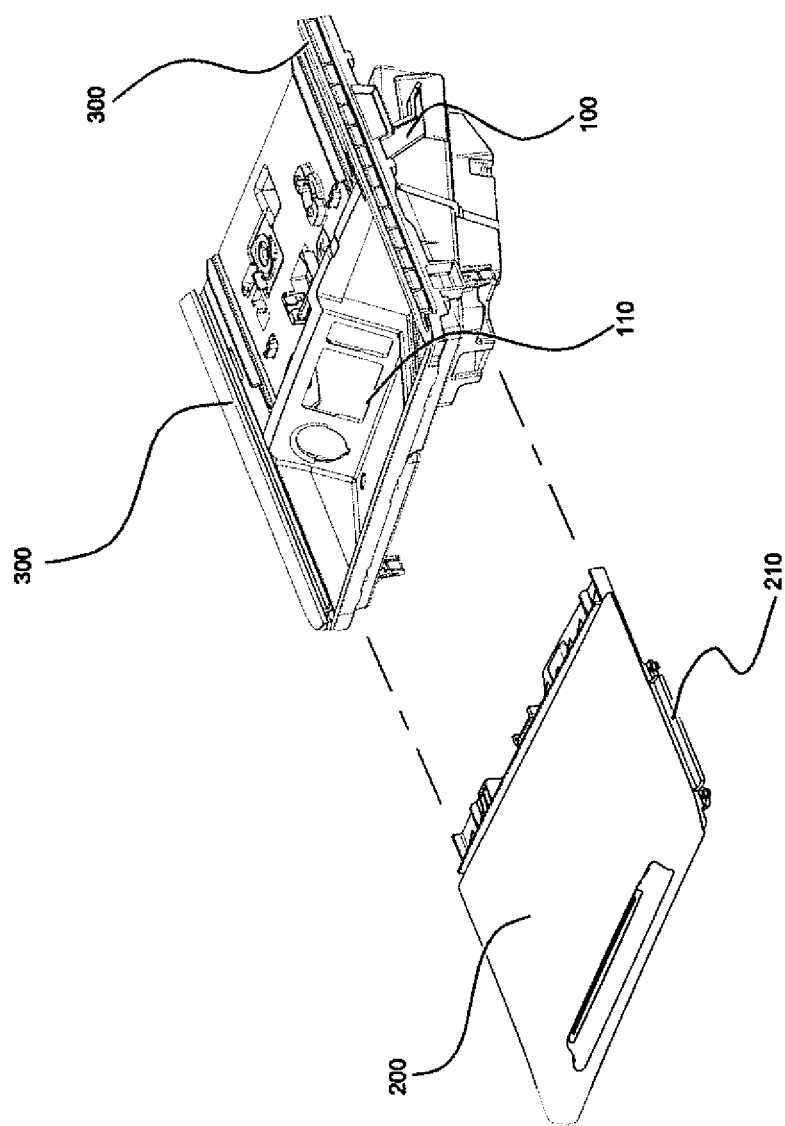
FIG. 2 is an exploded perspective view showing the coupling between the cover body and the tray body of a vehicle tray according to the present invention.
Figure 3:
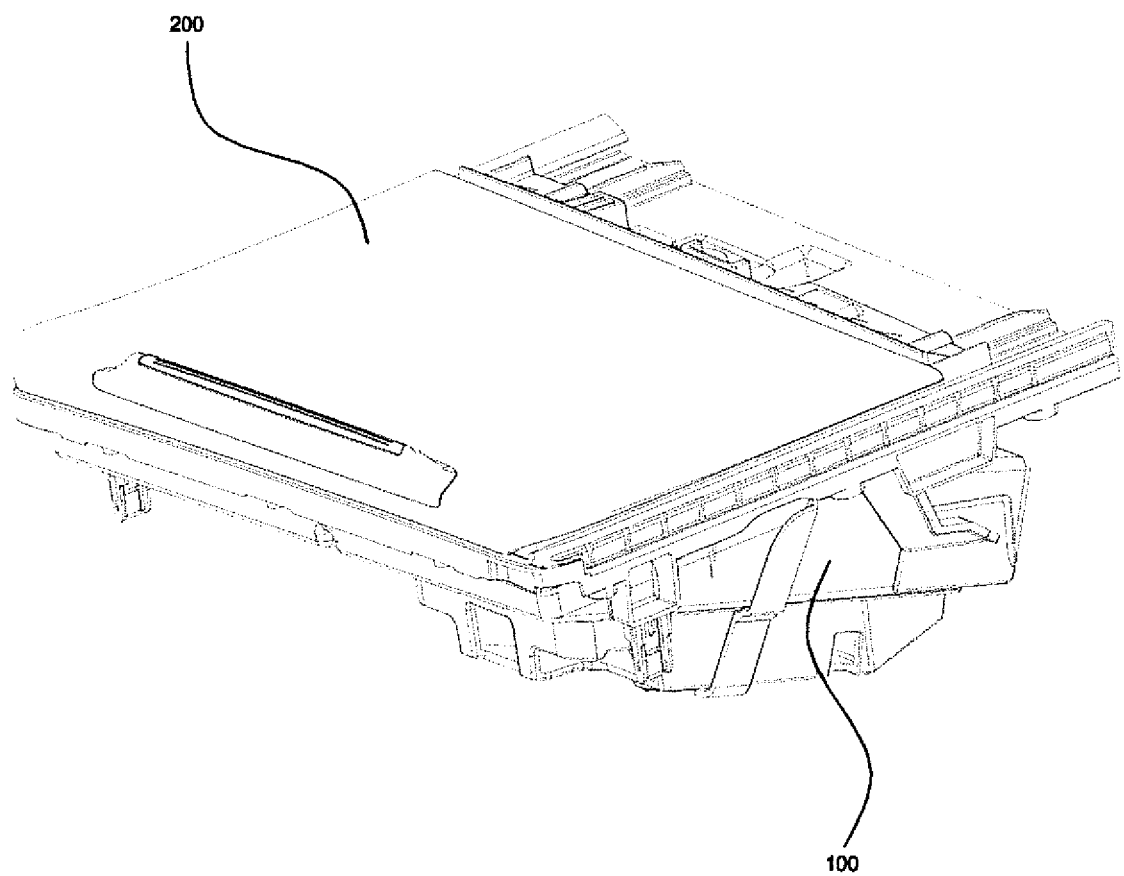
FIG. 3 is a perspective view of the vehicle tray according to the present invention.
Figure 4:
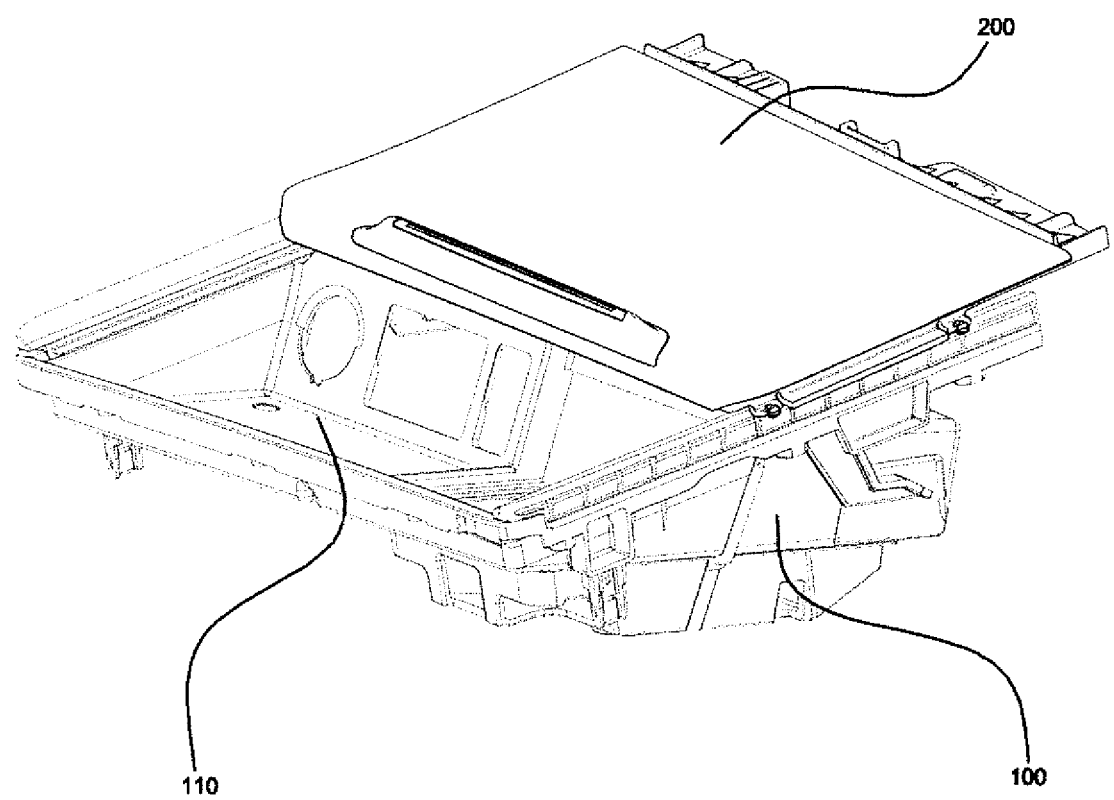
FIG. 4 is a perspective view showing the use state of the vehicle tray according to the present invention, in which the cover of the vehicle tray is slid to open the accommodation part of the tray body.
Figure 5:
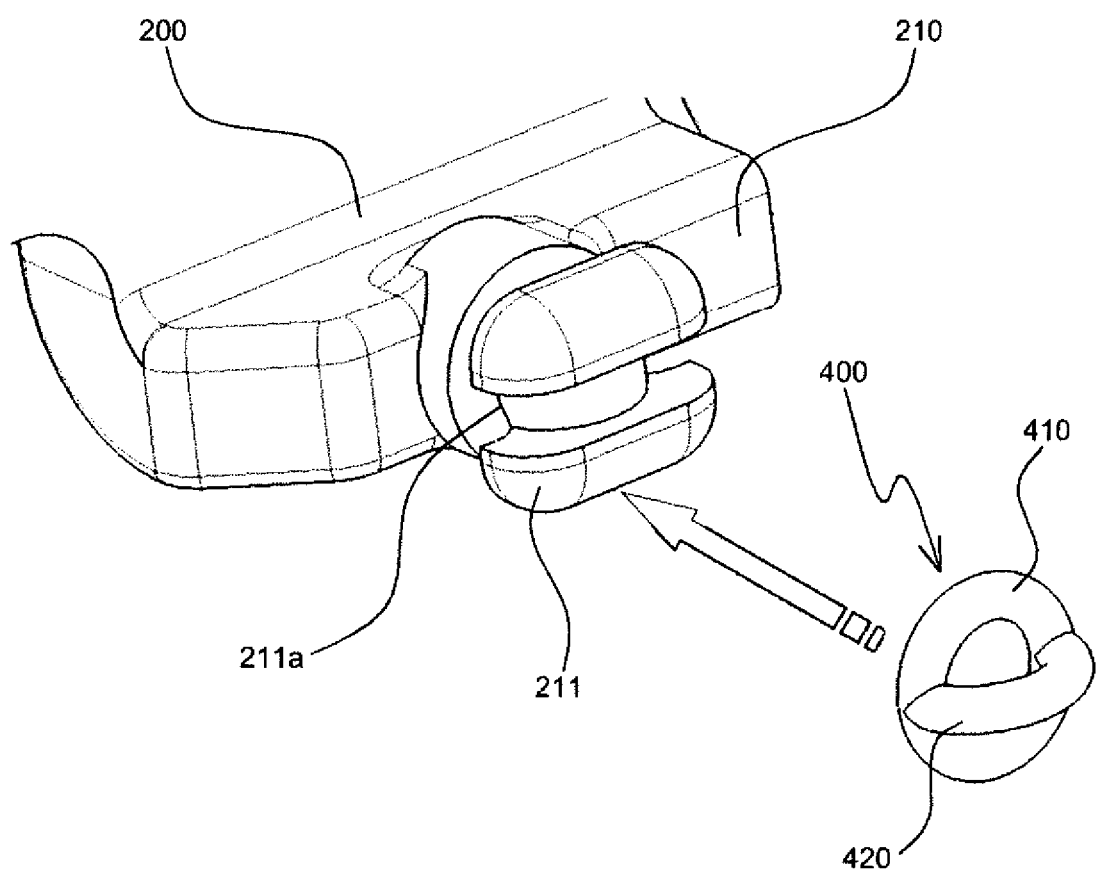
FIG. 5 is the enlarged perspective view of principal parts for showing the coupling between a silicone ring and guide protrusions formed on the cover of the vehicle tray according to the present invention.
Figure 6:
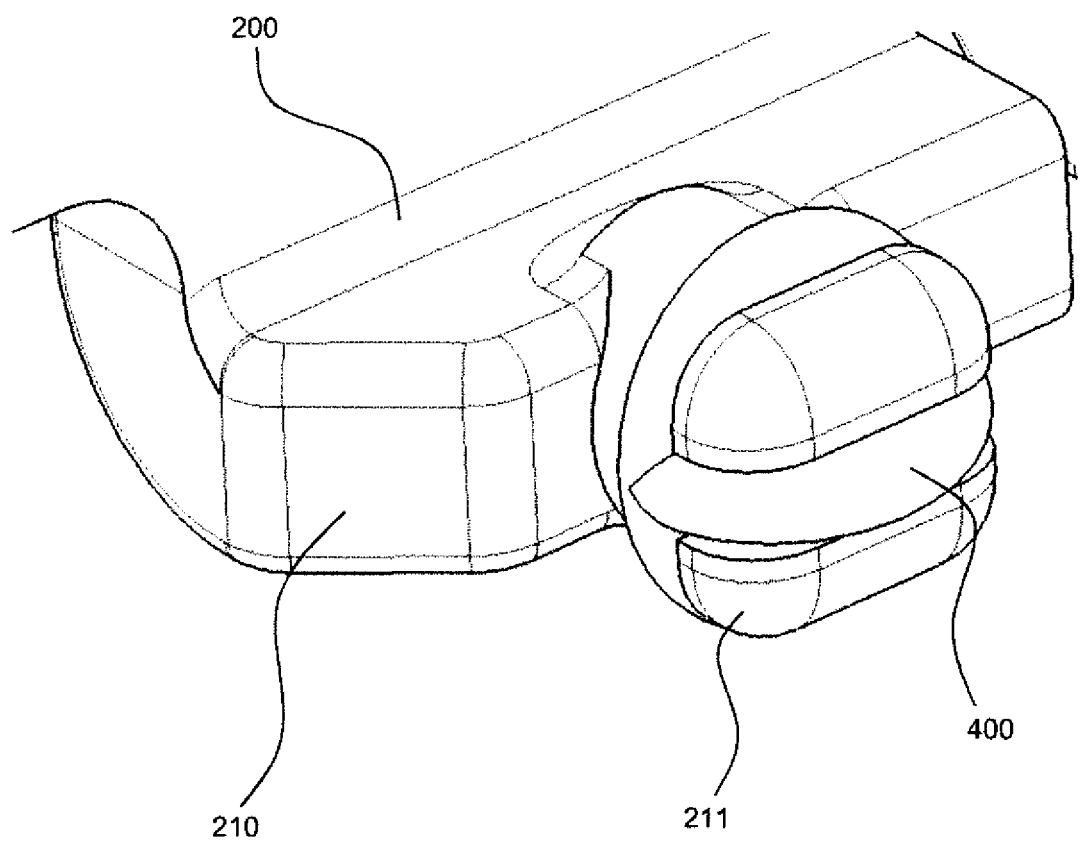
FIG. 6 is the enlarged perspective view of principal parts for showing a state, in which the silicone ring is coupled to the guide protrusions formed on the cover of the vehicle tray according to the present invention.
Figure 7:
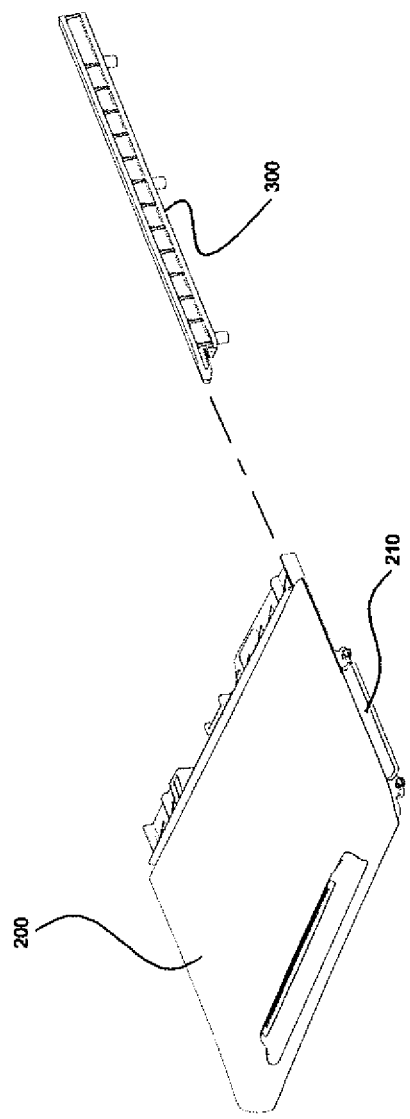
FIG. 7 is an exploded perspective view showing a state, in which the guide protrusions formed on the cover of the vehicle tray are inserted into the guide rails so as to be fixedly mounted on the left and right sides of the tray body, respectively.
Figure 8:
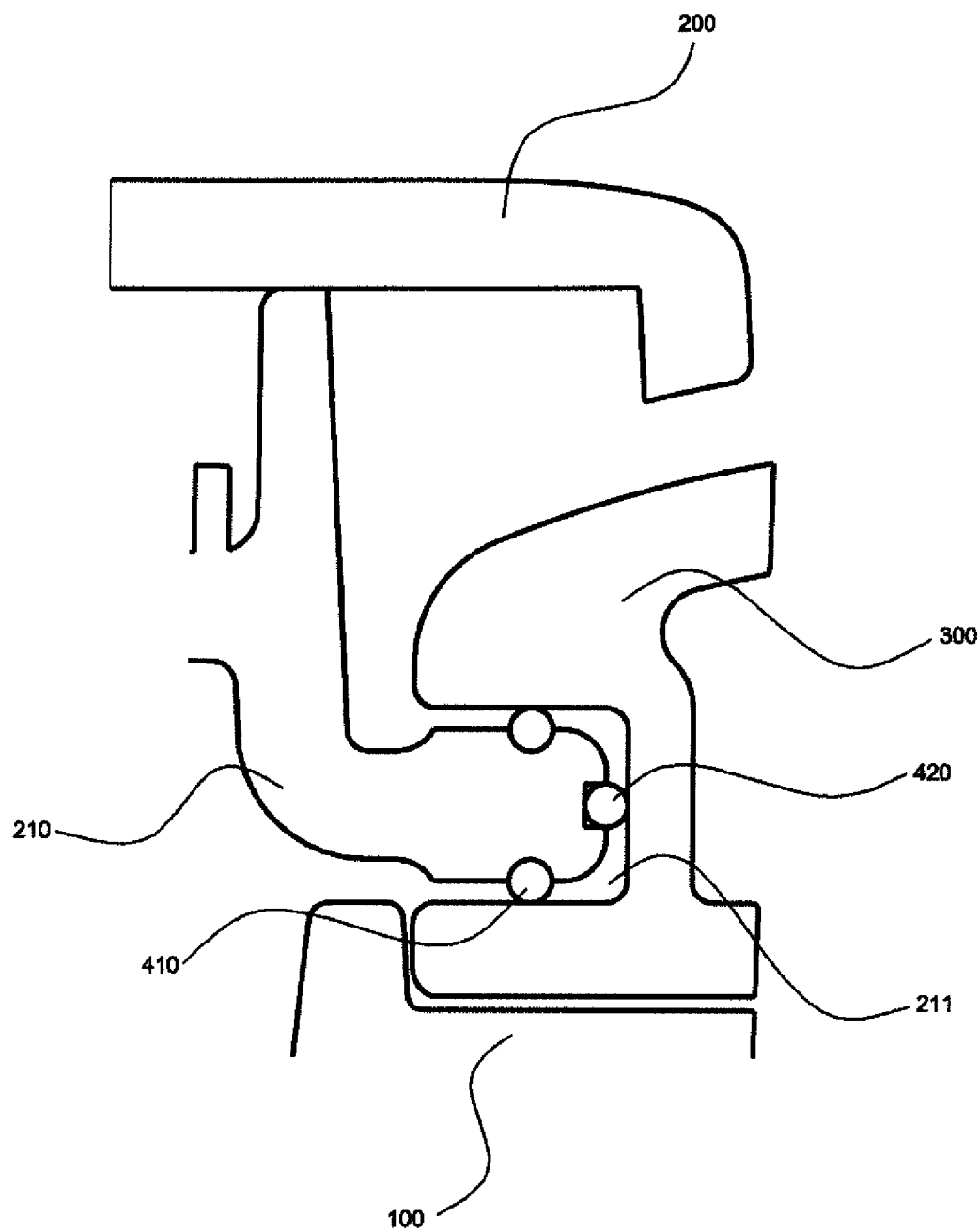
FIG. 8 is the enlarged perspective view of principal parts for showing a state, in which the guide protrusions formed on the cover of the present vehicle, are inserted into the guide rails mounted on the tray body and supported by the silicon ring so as to slide.

FIG. 2 is an exploded perspective view showing the coupling between the cover body and the tray body of a vehicle tray according to the present invention, FIG. 3 is a perspective view of the vehicle tray according to the present invention, FIG. 4 is a perspective view showing the use state of the vehicle tray according to the present invention, in which the cover of the vehicle tray is slid to open the accommodation part of the tray body, FIG. 5 is the enlarged perspective view of principal parts for showing the coupling between a silicone ring and guide protrusions formed on the cover of the vehicle tray according to the present invention, FIG. 6 is the enlarged perspective view of principal parts for showing a state, in which the silicone ring is coupled to the guide protrusions formed on the cover of the vehicle tray according to the present invention, FIG. 7 is an exploded perspective view showing a state, in which the guide protrusions formed on the cover of the vehicle tray according to the present invention are inserted into the guide rails so as to be fixedly mounted on the left and right sides of the tray body, respectively, and FIG. 8 is the enlarged perspective view of principal parts for showing a state, in which the guide protrusions formed on the cover of the vehicle tray according to the present invention, are inserted into the guide rails mounted on the tray body and supported by the silicon ring so as to slide.

As shown in FIG. 2 to FIG. 8, a vehicle tray according to the present invention includes a tray body 100 having an accommodation part 110 of which the upper side is open, guide rails 300 fixedly provided at both the left and right sides of the accommodation part 110 respectively, and a cover 200 having guide protrusions 210, which are formed to protrude from both the left and right sides thereof respectively and slidingly move while being guided along the guide rails 300.

Meanwhile, protrusion parts 211 having mounting grooves 211a protrude from the front and rear end portions of the guide protrusions 210 of the cover 200, and a silicone ring 400 having elastic force itself is provided on the protrusion part 211, wherein the outer surface of the silicon ring 400 comes into contact with the inner wall surface of the guide rail 300 while the inner surface of the silicon ring 400 is mounted on the mounting groove 211a.

In addition, the silicone ring 400 includes a first body 410, which is formed in an O-ring shape such that the outer surface of the first body 410 comes into contact with the upper and lower surfaces of the inner wall surface of the guide rail 300, and a second body 420, which is formed in a hemispherical shape such that the outer surface of the second body 420 comes into contact with the vertical surface of the inner wall surface of the guide rail 300, as shown in FIG. 5 and FIG. 6.

According to the vehicle tray of the present invention as structured above, the guide protrusions 210 formed on both the left and right sides of the cover 200 are slidably inserted into the guide rails 300 fixedly installed on both the left and right sides of the accommodation part 110 of the tray body 100 respectively.

Herein, the silicon rings 400 is provided on the protrusion parts 211 formed at the front and rear end portions of the guide protrusions 210 such that the inner surfaces of the silicon rings 400 are mounted and fixed to the mounting grooves 211a. Therefore, when the guide protrusions 210 are inserted into the guide rails 300, the outer surfaces of the silicon rings 400 are brought into contact with the inner wall surfaces of the guide rails 300.

Meanwhile, as shown in FIG. 5 and FIG. 6, the silicone rings 400 are installed on the protrusion parts 211 formed at the front and rear end portions of the guide protrusions 210 in the state, in which each of the silicon rings 400 is composed of the first body 410, which is formed in an O-ring shape such that the outer surface thereof comes into contact with the upper and lower surfaces of the inner wall surface of the guide rail 300, and the second body 420, which is formed in a hemispherical shape such that the outer surface thereof comes into contact with the vertical surface of the inner wall surface of the guide rail 300.

As a result, when the guide protrusions 210 are inserted into the guide rails 300, as shown in FIG. 8, the insertion is carried out in such a manner that the outer surfaces of the first bodies 410 of the silicone rings 400 come into contact with the upper and lower surfaces of the inner wall surfaces of the guide rails 300 and the outer surfaces of the second bodies 420 formed in the hemispherical shape come into contact with the inner wall surfaces of the guide rails 300.

If the cover 200 is slidably installed on the tray body 100 so as to be opened and closed along the guide rails 300 while being elastically supported by the silicone rings 400, it is possible to prevent the cover 200 from moving due to the operation gaps formed between the guide protrusions 210 and the guide rails 300, and to forestall the frictional sound that may be generated by the mutual contact between the guide protrusions 210 and the guide rails 300.

What is claimed is:

1. A vehicle tray comprising:
    a tray body (100) having an accommodation part (110) of which the upper side is open;
    guide rails (300) fixedly provided at left and right sides of the accommodation part (110) respectively;
    a cover (200) having guide protrusions (210), which are formed to protrude from left and right sides thereof respectively and slidingly move while being guided along the guide rails (300);
    protrusion parts (211) protrude from front and rear end portions of the guide protrusions (210) of the cover (200), each of the protrusion parts (211) having a mounting groove (211a); and
    a separate one of a plurality of silicone rings (400) each having elastic force itself is provided on a separate one of the protrusion parts (211) such that an outer surface of each of the plurality of silicon rings (400) comes into contact with an inner wall surface of one of the guide rails (300) while an inner surface of each of the silicon rings (400) is mounted on one of the mounting grooves (211a).

2. The vehicle tray according to claim 1, wherein each of the plurality of silicone rings (400) includes a first body (410), which is formed in an O-ring shape such that an outer surface of the first body (410) comes into contact with upper and lower surfaces of the inner wall surface of one of the guide rails (300), and a second body (420), which is formed in a hemispherical shape such that an outer surface of the second body (420) comes into contact with a vertical surface of the inner wall surface of one of the guide rails (300).

* * * * *